US005749055A

United States Patent [19]
Dahlin

[11] Patent Number: 5,749,055
[45] Date of Patent: May 5, 1998

[54] ANALOG RETRY

[75] Inventor: Steinar Dahlin, Jarfalla, Sweden

[73] Assignee: Telefonaktiebolaget LM Ericsson, Stockholm, Sweden

[21] Appl. No.: 685,802

[22] Filed: Jul. 24, 1996

Related U.S. Application Data

[63] Continuation of Ser. No. 980,715, Nov. 24, 1992, abandoned.

[51] Int. Cl.$^6$ ........................................ H04B 1/38
[52] U.S. Cl. ........................ 455/553; 455/62; 455/63; 455/439; 455/453
[58] Field of Search ........................ 455/33.1–34.2, 455/53.1–54.2, 56.1, 62–63, 67.3, 15, 126–127, 295, 297, 450–453, 552–553, 455, 438–439, 515; 379/58–63; 375/5, 216; 370/93, 94.1, 328–331

[56] References Cited

U.S. PATENT DOCUMENTS

| | | |
|---|---|---|
| 4,144,412 | 3/1979 | Ito et al. . |
| 4,144,496 | 3/1979 | Cunningham et al. . |
| 4,435,840 | 3/1984 | Kojima et al. . |
| 4,670,899 | 6/1987 | Brody et al. . |
| 4,756,753 | 7/1988 | Schmidt . |
| 4,799,252 | 1/1989 | Eizenhoffer et al. . |
| 4,914,651 | 4/1990 | Lusignan . |
| 5,008,953 | 4/1991 | Dahlin et al. . |
| 5,042,082 | 8/1991 | Dahlin . |
| 5,056,109 | 10/1991 | Gilhousen et al. . |
| 5,081,671 | 1/1992 | Raith et al. . |
| 5,128,629 | 7/1992 | Trinh ........................... 455/126 |
| 5,218,630 | 6/1993 | Patsiokas et al. . |
| 5,257,401 | 10/1993 | Dahlin et al. ............... 455/33.2 |
| 5,287,556 | 2/1994 | Cahill ........................... 455/266 |
| 5,293,641 | 3/1994 | Kallin et al. ................. 455/63 |
| 5,301,356 | 4/1994 | Bodin et al. ................. 455/33.2 |
| 5,305,308 | 4/1994 | English et al. .............. 370/94.1 |
| 5,335,355 | 8/1994 | Tanaka et al. ............... 455/33.1 |

FOREIGN PATENT DOCUMENTS

90/13187  11/1990  WIPO .

*Primary Examiner*—Reinhard J. Eisenzopf
*Assistant Examiner*—Lee Nguyen
*Attorney, Agent, or Firm*—Burns, Doane, Swecker & Mathis, L.L.P.

[57] ABSTRACT

In a cellular mobile system having both analog and digital traffic channels and including a land system serving a plurality of cells and a plurality of mobile stations capable of using analog and digital traffic channels, a method of reducing disturbance of communications within the system comprising the steps of:

in the land system:
  sending a directed retry order to a dual mode mobile station identifying at least one target cell;

in the mobile station:
  accessing one of said at least one target cells identified in the received directed retry order; and in the accessed target cell:
  assigning to the accessing mobile station an analog traffic channel in preference over a digital traffic channel.

3 Claims, 7 Drawing Sheets

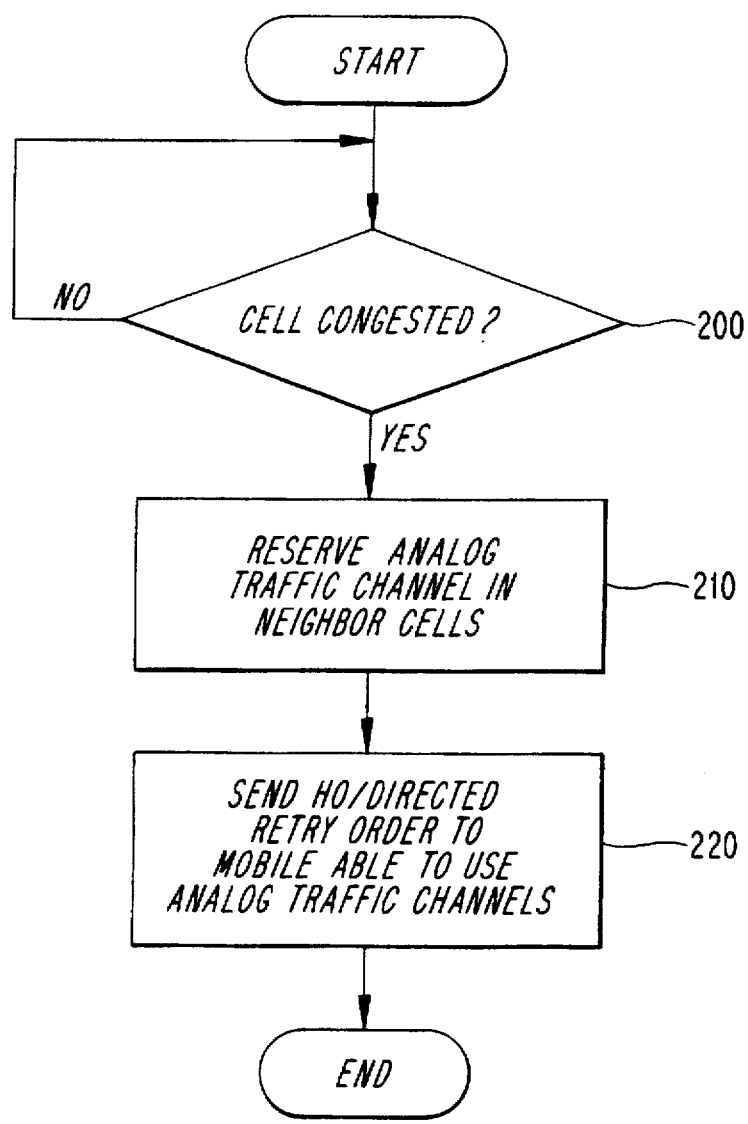

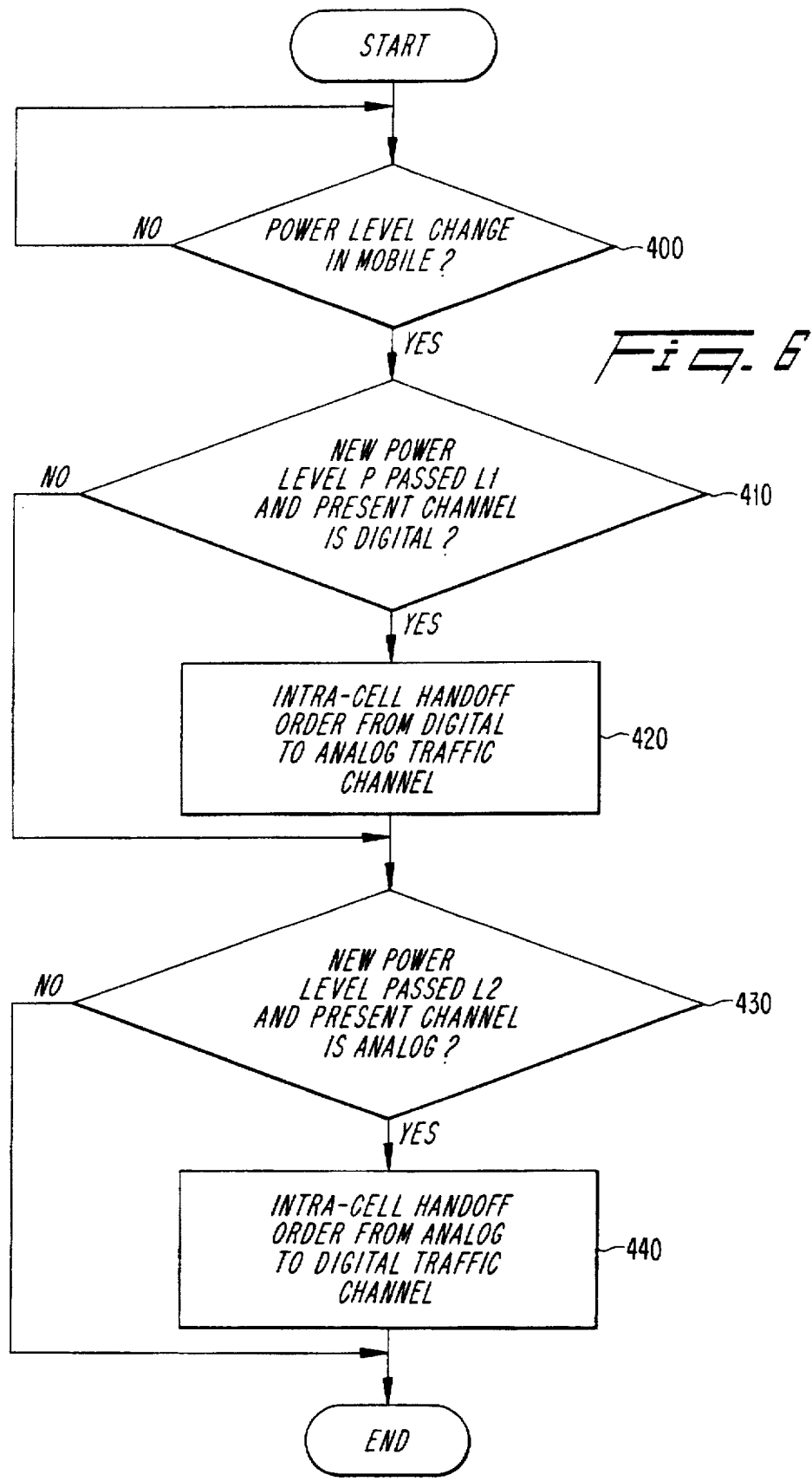

ANALOG RETRY

This application is a continuation of application Ser. No. 07/980,715, filed Nov. 24, 1992, abandoned.

BACKGROUND OF THE INVENTION

The present invention is directed to a method and apparatus for controlling traffic in a cellular radio communications network in such a manner as to reduce disturbance in the network, and more particularly to a method and apparatus for controlling traffic in a cellular system including both TDMA and FDMA traffic channels.

Originally, cellular radio communication networks were analog systems, transmitting speech on analog traffic channels using frequency division multiple access (FDMA) techniques. Upon the advent of the application of digital technology to cellular communications, digital systems were designed to cooperate with the existing analog systems to form dual-mode systems. Such dual-mode systems were capable of communicating on analog and/or digital traffic channels. Digital channels normally use time division multiple access (TDMA) techniques. Hand-off operations for such dual-mode systems can not be selected to the same as any handoff process for any digital system. One handoff technique for dual-mode systems is described in U.S. Pat. No. 5,042,082, assigned to the same assignee, which is hereby incorporated by reference in its entirety.

According to American digital cellular standards, as set forth in EIA/TIA IS-54, Rev. A, congestion in a cell may lead to the issuance of a directed retry order. That is, mobile stations experiencing congestion when accessing a particular cell may be ordered by the land system to try and access one of a number of possible neighbor cells specified in a particular order. Thus, the mobile station involved may be assigned any idle traffic channels available in a neighbor cell. However, this entails extra interference or reception disturbances in the network. These disturbances are the result of at least two factors: first, the mobile station is assigned a traffic channel from a relatively distant base station which is not according to the frequency plan; second, the mobile station sends its communication on the traffic channel with a relatively high power level. Both of these factors negatively influence signal to noise ratios (C/I) in the network. This is particularly true if the traffic channel assigned is a digital channel, because the frequency spectrum of a digital TDMA channel is approximately the same regardless of whether or not the subscriber is talking, whereas the frequency spectrum of analog traffic channels consists of the carrier only during silence periods and of wider spectrum only when speech modulates the carrier.

Congestion in a cell may also be solved by handing off calls in progress to neighboring cells which have a lower traffic load. One example of a load sharing method is disclosed in U.S. Ser. No. 07/669,865 U.S. Pat. No. 5,241, 685 filed Mar. 15, 1991, and assigned to the same assignee. An example of another load balancing method is described in U.S. Pat. No. 4,670,899 to Brody et al. According to the Brody et al. patent, a voice channel occupancy level is computed periodically using the channel utilization of each cell. Calls from cells with higher voice channel occupancy levels are handed off to adjacent cells with lower voice channel occupancy levels. Depending on the voice channel occupancy levels of the cell, the cell enters one of four states. In one state, complete cell blockage is prevented by directing cells to hand off calls to adjacent cells. In another, voice channels are preserved for incoming hand-offs by denying access to mobile stations initiating new calls. The other two states are either a combination of the first two, or a normal state in which all calls are handled normally. Another such system is described in U.S. Pat. No. 4,435,840 to Kojima et al. In these types of systems, however, C/I in the network may also be negatively affected by the load balancing operation, particularly in cases where the traffic channel assigned in the target cell is a digital TDMA channel.

Another type of system used to reduce blockages occurring during hand-off in a mobile cellular system is disclosed in U.S. Pat. No. 5,081,671 to Raith et al., assigned to the same assignee, and hereby incorporated by reference. According to the patented method, a small number of rescue channels in an n-cell cluster are reserved for use to satisfy hand-off requests in an m-cell cluster, where n is greater than m. This patent does not differentiate between analog and digital channels, and so does not address the advantages to be gained from reserving analog traffic channels for hand-off.

If a mobile station is within a cell having a large coverage area, but at the periphery of that cell, then the sending power of the mobile station will be relatively high. If the mobile station in question sends its communication on a digital traffic channel, the disturbance to the network will be worse than if it sends on an analog channel, due to the above described frequency spectrum difference between analog and digital traffic channels.

SUMMARY OF THE INVENTION

According to the present invention, the adjacent channel disturbance problems within a cellular network may be reduced by assigning preferably analog traffic channels to mobile stations capable of using analog or analog and digital traffic channels based on a predetermined criteria based on power. One criteria is satisfied when the sending power required is above a threshold L1. A second criteria is satisfied when the mobile station is accessing a base station due to a directed retry order. When a directed retry order is sent, the mobile necessarily must transmit at a higher power level in order to successfully transmit to the new base station.

The above described disturbance problems may also be reduced by preferably handing off mobile stations capable of using analog or analog and digital traffic channels from cells approaching congestion to less congested neighboring cells and assigning preferably analog traffic channels in the target cells.

The above described disturbance problems may also be reduced by preferably allowing analog traffic channels to be used at the periphery of a cell. This may be achieved, for example, by making an intra-cell handoff to an analog channel when the power level required for sending from a mobile station passes over a threshold. Conversely, mobile stations using analog traffic channels may be handed off to a digital traffic channel when the power level required for sending in the mobile station passes under a threshold.

According to one embodiment of the present invention, in a cellular mobile system having both analog and digital traffic channels, and including a plurality of cells and a plurality of mobile stations capable of using analog traffic channels or analog and digital traffic channels, a method is provided of reducing disturbance of communications within the system comprising assigning traffic channels for mobile stations based on predetermined criteria based on power.

In one embodiment of the present invention, in a cellular mobile system having both analog and digital traffic channels and including a land system serving a plurality of cells and a plurality of mobile stations capable of using analog traffic channels or analog and digital traffic channels, a method is provided of reducing disturbance of communications within the system including the steps of detecting a requirement for changing the power level of a mobile station, comparing the required power level to at least one threshold for determining intra-cell handoff, and sending an intra-cell handoff order to the mobile station when the detected power level passes the at least one threshold.

In one embodiment of the present invention, in a cellular mobile system having both analog and digital traffic channels and including a land system serving a plurality of cells and a plurality of mobile stations capable of using analog traffic channels or analog and digital traffic channels, a method is provided of reducing disturbance of communications within the system comprising the step of diverting communications traffic to analog traffic channels of neighboring cells from cells experiencing relatively heavy traffic load if one is available.

In one embodiment of the present invention, in a cellular mobile system having both analog and digital traffic channels and including a land system serving a plurality of cells and a plurality of mobile stations capable of using analog traffic channels or analog and digital traffic channels, a method is provided of reducing disturbance of communications within the system comprising the steps of in the land system, sending a directed retry order to a mobile station, which order identifies at least one target cell, in the mobile station, accessing one of the target cells identified in the received directed retry order, and in the accessed target cell, assigning to the accessing mobile station an analog traffic channel in preference over a digital traffic channel.

In one embodiment of the present invention, in a cellular mobile system having both analog and digital traffic channels and including a land system serving a plurality of cells and a plurality of mobile stations capable of using analog traffic channels or analog and digital traffic channels, a method is provided of reducing disturbance of communications within the system comprising the steps of, in the land system, detecting a need to divert communications traffic from an overloaded cell to a neighbor cell, sending a handoff order to a mobile station capable of using at least analog traffic channels to handoff to a target cell, in the mobile station, tuning to the channel of the target cell identified in the handoff order, and in the target cell, assigning the analog traffic channel to the mobile station.

In one embodiment of the present invention, in a cellular mobile system having analog and digital traffic channels and including a plurality of base stations and a plurality of mobile stations, at least one of the mobile stations being capable of using analog traffic channels and digital traffic channels, an apparatus for reducing disturbance in the system comprising means for determining the power level required to transmit communication signals from mobile stations to the base station, and means for assigning traffic channels to the mobile stations based on a predetermined criteria based on power.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIG. 4 is a flow chart of a method carried out in the land system according to an embodiment of the present invention;

FIG. 6 is a flow chart of a method carried out within a cell according to an embodiment of the present invention;

DETAILED DESCRIPTION OF THE PREFERRED EMBODIMENTS

The present invention involves controlling traffic in a dual-mode cellular telephone network.

Figure 1:
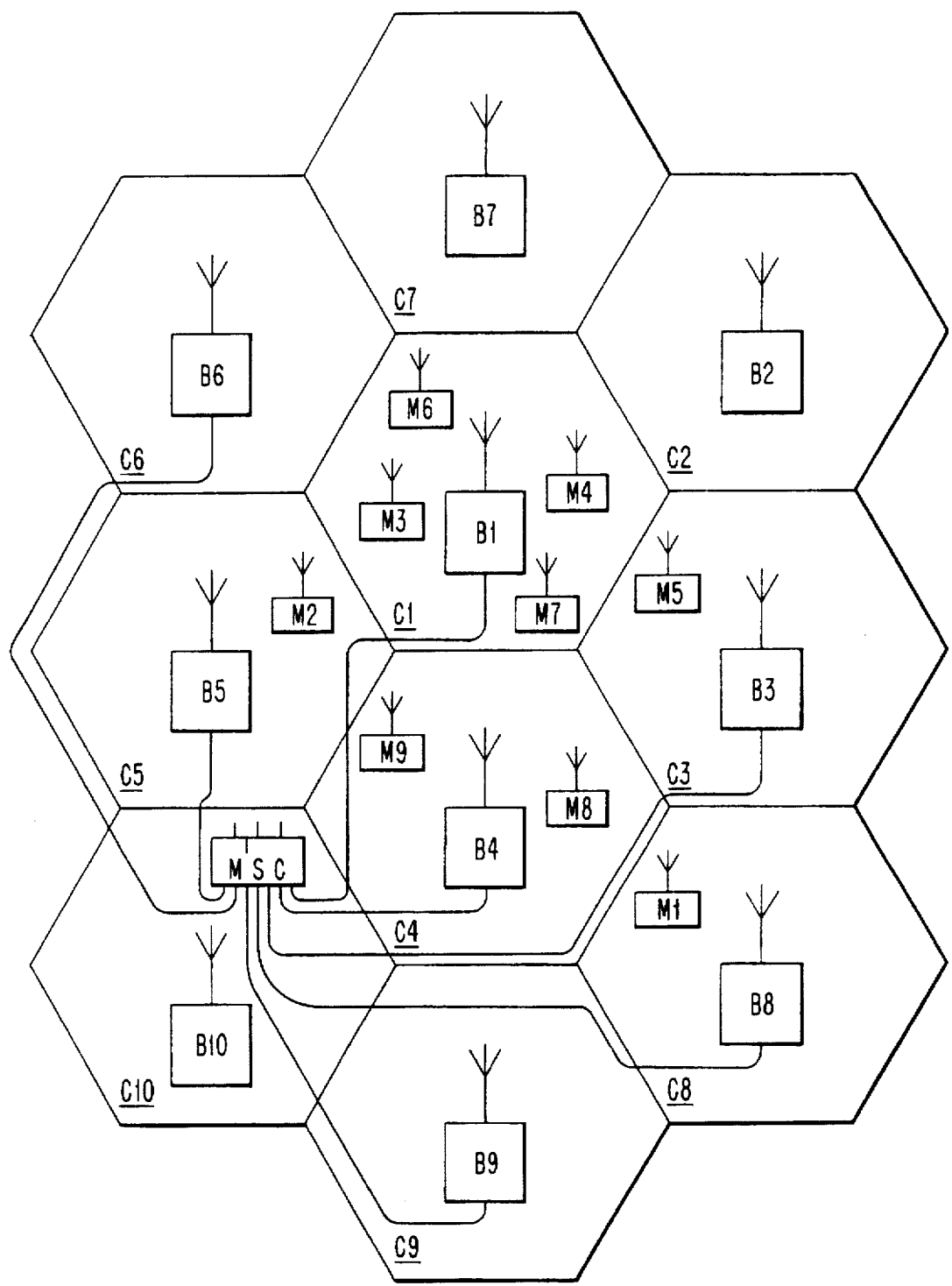
FIG. 1 illustrates part of a cellular telephone system with cells, a mobile switching center, base stations, and mobile stations.

FIG. 1 illustrates ten cells C1 to C10 in a cellular mobile radio system. In actual practice, the method and means according to the present invention are implemented in a cellular mobile radio system comprising many more cells than ten. However, for the purpose of explaining the present invention, ten cells is deemed to be sufficient.

For each of these cells C1 through C10 there is a base station B1 through B10, respectively, with the same number as the cell. FIG. 1 illustrates base stations situated in the vicinity of the center of the cell and having omni-directional antennas. The base stations of adjacent cells may, however, be allocated in the vicinity of cell borders and have directional antennas as is well known to those of ordinary skill in the art. In a known manner, each of the base stations have assigned to them a plurality of traffic channels. In a dual-mode system, some of these traffic channels are digital and some are analog.

FIG. 1 also illustrates ten mobile stations M1 through M10 which are movable within a cell and from one cell to another cell. In actual practice, the method and means according to the present invention are implemented in a cellular mobile radio system comprising many more mobile stations than ten. In particular, there are usually many more mobile stations than there are base stations. However, for the purpose of explaining the present invention, the use of ten mobile stations is deemed to be sufficient.

The system of FIG. 1 also includes a mobile switching center MSC. The mobile switching center is connected to all ten illustrated base stations by cables. The mobile switching center is also connected, by cables, to a fixed public switching telephone network or similar fixed network with ISDN facilities. All cables from the mobile switching center to the base stations and cables to the fixed network are not illustrated.

In addition to the mobile switching center illustrated, there may also be another mobile switching center connected by cables to other base stations than those illustrated in FIG. 1. Instead of cables, other means may be utilized for base to mobile station switching center communication, e.g. fixed radio links. In some systems, there may also be base station controllers, each connected between a mobile switching center and one or more of the base stations.

The cellular mobile radio system illustrated in FIG. 1 comprises a plurality of radio channels for communication. The system is designed both for analog information, e.g. speech, digitize analog information, digitized speech, and pure digital information. According to the system, the term connection is used for a communication channel established between a mobile station and another mobile station in the same system or another system, or a fixed telephone or terminal in a fixed network connected to the cellular mobile radio system. Thus, a connection may be defined as a call where two persons are able to talk to each other, but also may refer to a data communication channel where computers are exchanging data. Furthermore, a communications channel, or simply a channel, is defined as a particular signalling path between a mobile and a base station. A channel may include, but is not limited to, a specific frequency in a FDMA system, a specific time slot or set of time slots in TDMA, and a specific coding in CDMA.

Figure 2:
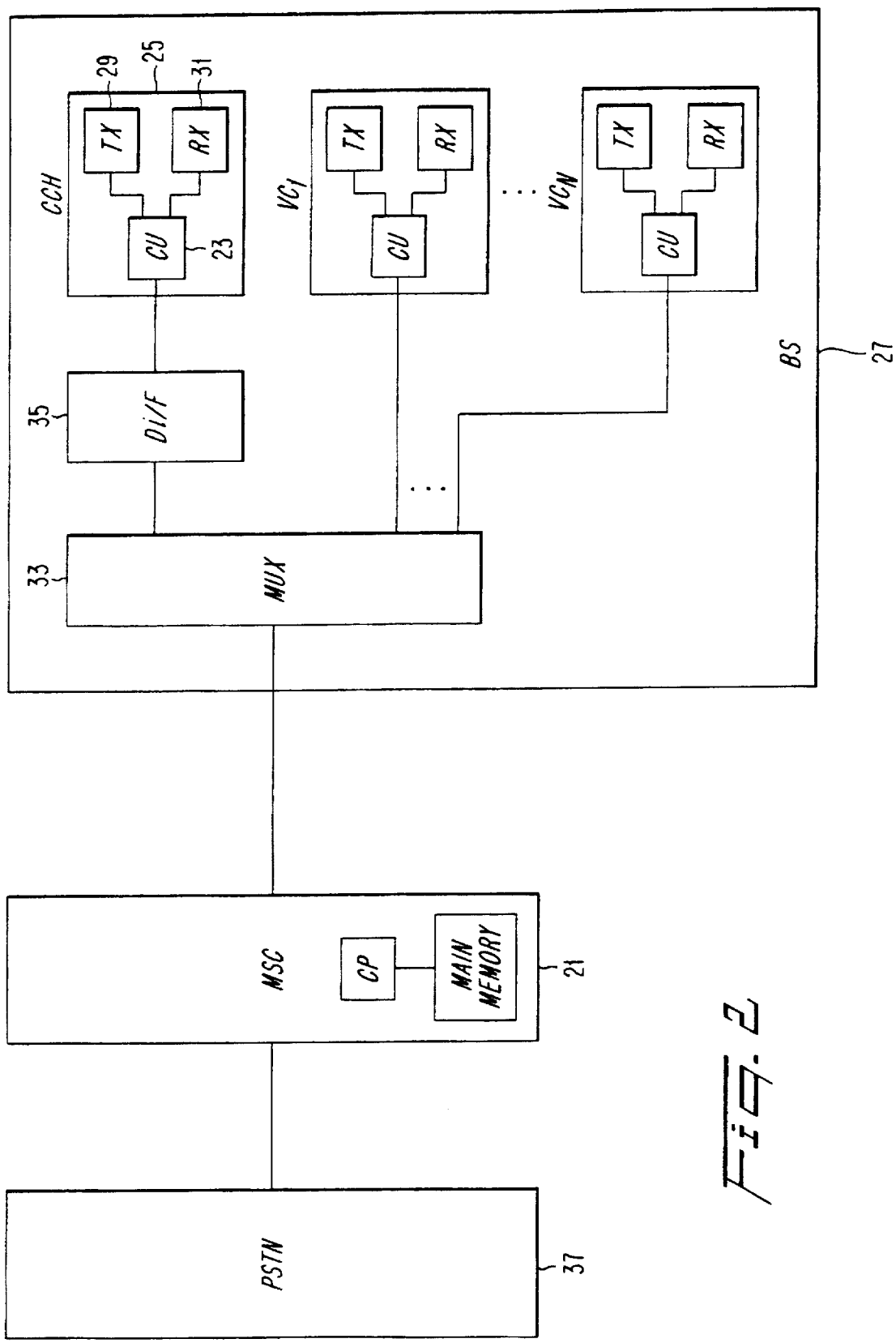
FIG. 2 is a block diagram of part of a cellular mobile radiotelephone system that may be used to implement the present invention.

FIG. 2 is a block diagram illustrating part of the hardware in which the present invention may be implemented. The determinations of congestion in a cell are made by the mobile switching center MSC 21 serving that cell. The mobile switching center MSC 21 includes a central processor CP and a main memory. Measurements of signal strength during service requests are performed by the control unit CU 23 of the control channel CCH 25 of the cell's base station BS 27. The control unit CU 23 controls a radio transmitter TX 29 and a radio receiver RX 31, the three units together realizing a radio channel. In addition to the control channel CCH 25, a number of voice channels $VC_1$ to $VC_N$ are also provided. Communications on the voice channels are multiplexed directly to and from the switching center MSC 21 through a multiplexer MUX 33. Communications between the control channel CCH 25 and the switching center MSC 21 are formatted by a digital interface Di/F 35. The switching center MSC 21 is connected to the public telephone switching network PTSN 37.

Figure 3A:
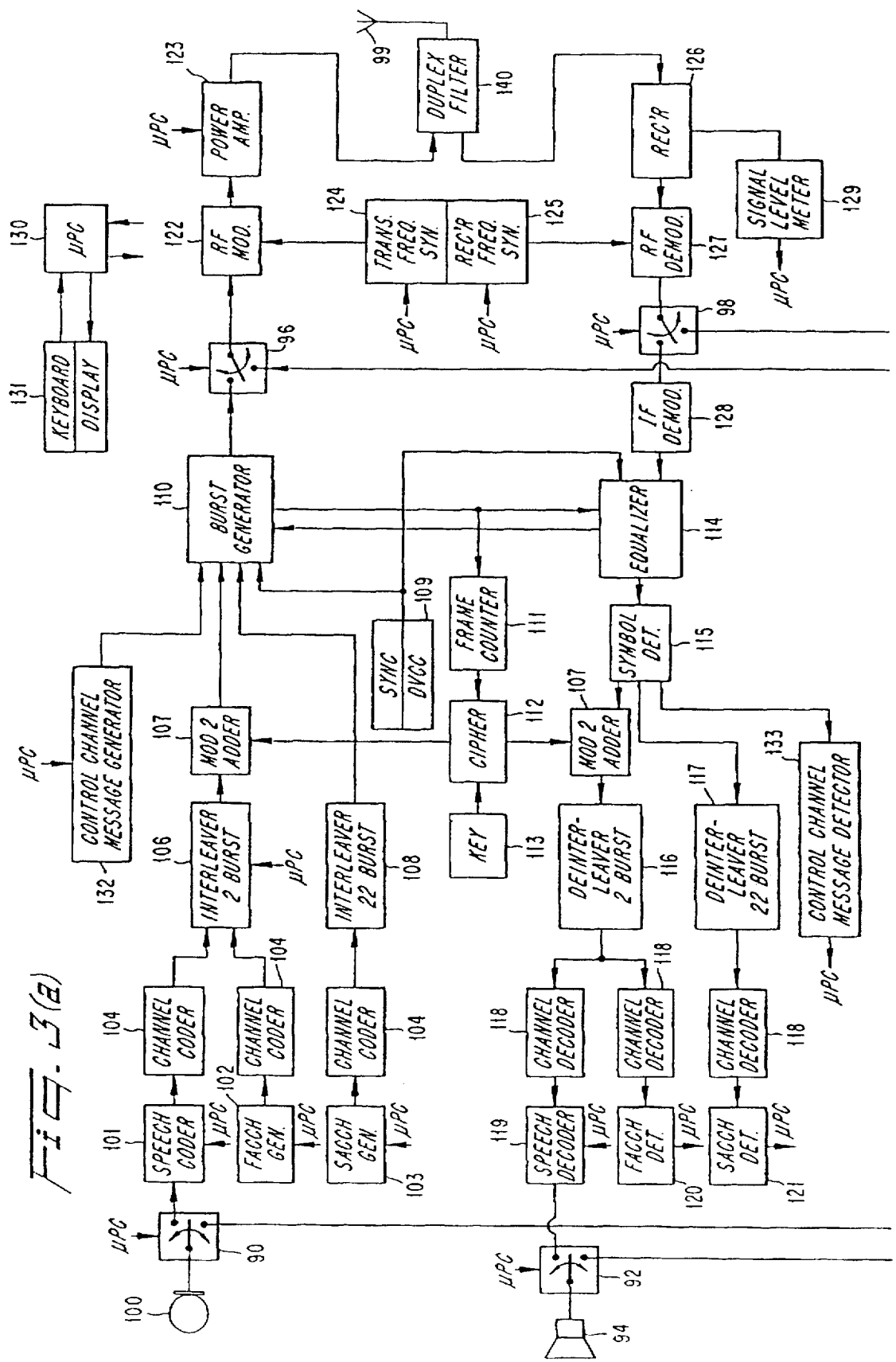
FIGS. 3(a) and 3(b) together constitute a block diagram of a dual-mode mobile station having both analog and digital control channel capabilities that may be used in accordance with the present invention.
Figure 3B:
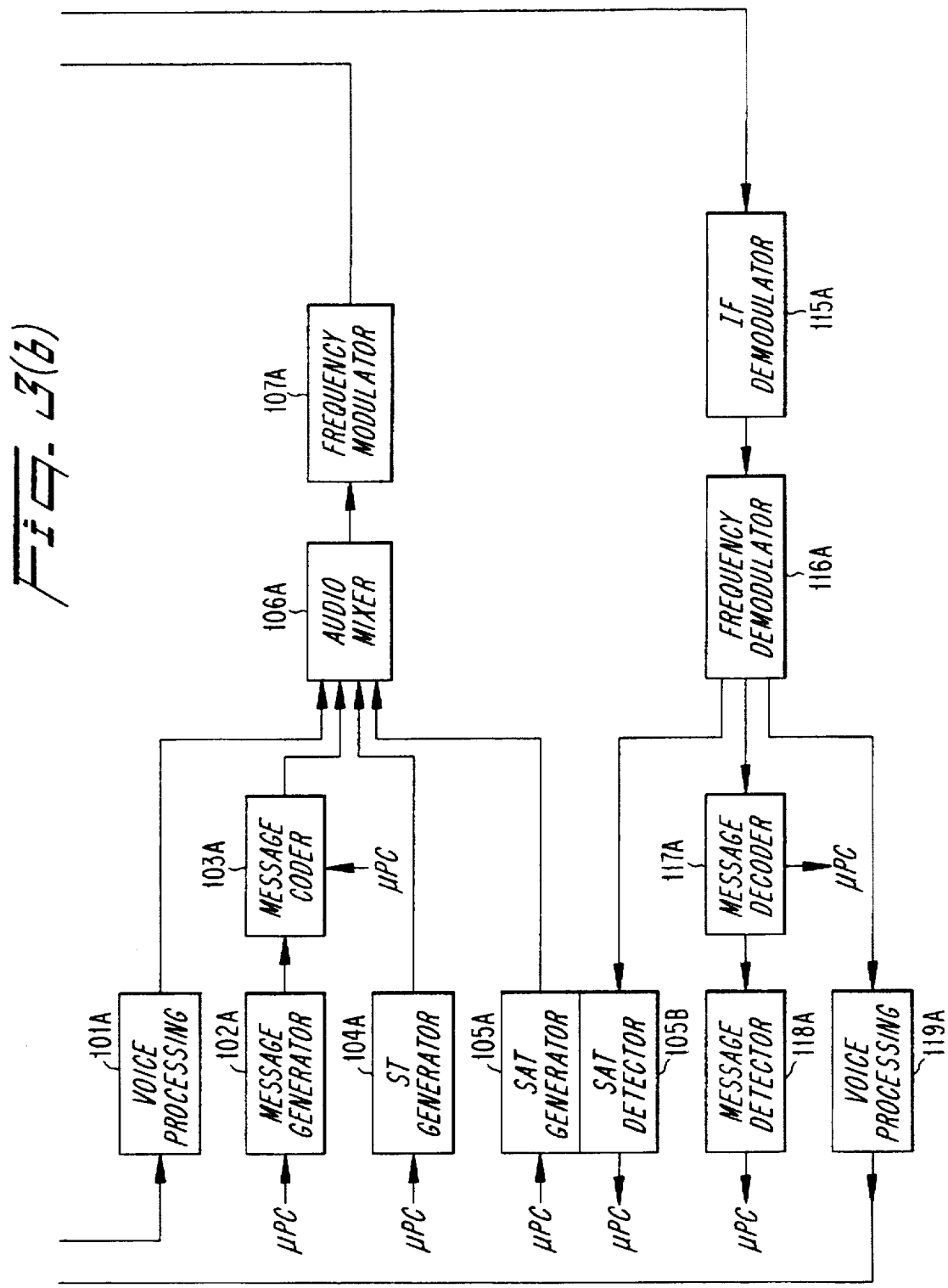

Referring now to FIGS. 3(a) and 3(b), one embodiment of a multi-mode mobile station for use in a cellular telephone system that operates in accordance with the present invention is illustrated. With respect to digital traffic communications, i.e., where digitized voice information is transmitted between base and mobile stations, the operation of the system is explained in the context of full-rate transmissions, in which each packet of digital information is interleaved between two spaced time slots in a frame of data. It will be readily appreciated, however, that the invention is equally applicable to other types of cellular radio systems, such as those in which information is transmitted digitally at half rate.

In the digital part of the multi-mode mobile station depicted in FIG. 3(a), speech signals from a microphone 100 are received at an analog-digital mode switch 90 which is controlled by an output signal from a microprocessor controller 130. Depending upon the mode of the mobile station, the microprocessor controller 130 directs the mode switch 90 to connect the microphone output signals to a speech coder 101 for a mobile station operating in a digital mode (digital traffic channel) or to a voice processing unit 101A for a mobile station operating in an analog mode (analog traffic channel).

In the digital mode, the speech coder 101 converts the analog signal from the microphone 100 into a binary data stream. The data stream is divided into data packages, according to the time division, multiple access (TDMA) principle. A fast associated control channel (FACCH) generator 102 generates control and supervision signalling messages that are transmitted from the mobile station to the land-based station. The FACCH message replaces a user frame of speech or data whenever it is to be transmitted. A slow associated control channel (SACCH) generator 103 provides signalling messages that are transmitted over a continuous channel for exchange of information between the base station and the mobile station and vice versa. A fixed number of bits, e.g., twelve, is allocated to the SACCH for each time slot of a message stream. The channel coders 104 are connected to the speech coder 101, FACCH generator 102 and SACCH generator 103 for manipulating the incoming data in order to carry out error detection and correction. The techniques used by the channel coders are preferably convolutional encoding, which protects important data bits in the speech code, and cyclic redundancy check (CRC), wherein the significant bits in the speech coder frame, e.g., twelve bits, are used for computing a 7-bit check.

A two-burst interleaver 106 is coupled to the channel coders 104. The two-burst interleaver 106 is controlled by the microprocessor controller 130 so that, at appropriate times, user information over a particular speech channel is replaced with system supervision messages over the FACCH. Data to be transmitted by the mobile station is interleaved over two distinct time slots. A packet of 260 data bits that constitute one transmitting word, are divided into two equal parts and are allotted to two different time slots. The effects of Rayleigh fading will be reduced in this manner. The output of the two-burst interleaver 106 is provided to the input of a modulo-two-adder 107 so that the transmitted data is ciphered bit-by-bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over 22 time slots, each burst of SACCH data consisting of 12 bits of information.

The mobile station further includes a Sync Word—DVCC generator 109 for providing the appropriate synchronization word (Sync Word) and DVCC (digital verification color code) which are to be associated with a particular connection. The Sync Word is a 28 bit word used for time slot synchronization and identification. The DVCC is an 8-bit code sent by the base station to the mobile station and vice-versa for assuring that the proper channel is being decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control channel message generator 132, to integrate the various pieces of information from these respective units into a single bit stream. For example, according to the published U.S. standard EIA/TIA IS-54, Rev. A, a message burst comprises data (260 bits), SACCH (12 bits), Sync Word (28 bits), coded DVCC (12 bits), and 12 delimiter bits, combined for a total of 324 bits. Under the control of the microprocessor 130, two different types of message bursts are generated by the burst generator 110: control channel message bursts from the control channel message generator 132 and voice/traffic message bursts.

The control channel message generator 132 generates digital control messages for transmission over a digital control channel. Digital control channel messages are received by the control channel message detector 133. Only the multi-mode mobile stations have this capability to utilize digital control channels. It should be noted that FIGS. 3(a)

and 3(b) also show the essential hardware blocks for a dual-mode mobile station. Dual-mode mobile stations, however, do not use digital control channels and therefore do not have the control channel message generator 132 and detector 133 and the associated software in the microprocessor controller 130. Unlike the control messages sent over the FACCH, which replace traffic bursts on the traffic channels, the control message bursts generated by the control channel message generator 132 are transmitted over a digital control channel and do not replace any traffic bursts.

The transmission of a burst, equivalent to one time slot, is synchronized with the transmission of other time slots, which together make up a frame of information. For example, under the mentioned U.S. standard, a frame may comprise three full-rate transmission time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. Pat. No. 5,088,108 and assigned to the same assignee. The text of this patent is incorporated herein by reference. Briefly, the base station functions as the master and the mobile station is the slave with respect to frame timing. The equalizer 114 detects the timing of an incoming bit stream from the base station and synchronizes the burst generator 110. The equalizer 114 also checks the Sync Word and DVCC for identification purposes.

The burst generator 110 is coupled to a frame counter 111 and to the equalizer 114. The frame counter 111 updates a ciphering code utilized by the mobile station for each transmitted frame, e.g. once every 20 ms. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

In a digital mode, the burst produced by the burst generator 110, is forwarded to an RF modulator 122 through an analog/digital mode switch 96 that is controlled by the microprocessor controller 130. The RF modulator 122 is operable for modulating a carrier frequency according to the π/4-DQPSK method (π/4 shifted, Differentially encoded Quadrature Phase Shift Keying). The use of this technique implies that the information is differentially encoded, i.e., 2-bit symbols are transmitted as four possible changes in phase; ±π/4 and ±3π/4. The transmitter carrier frequency supplied to the RF modulator 122 is generated by a transmitting frequency synthesizer 124 in accordance with the selected transmitting channel. The modulated carrier is transmitted via an antenna 99 through a duplex filter 140. The duplex filter 140 is used for simultaneous transmission and reception via the same antenna 99 on the communications channel which is necessary in analog mode. The carrier is amplified by a power amplifier 123. The RF power emission level of the amplifier is selected on command by a microprocessor controller 130.

A receiver carrier frequency signal is generated in accordance with the selected receiving channel by receiving frequency synthesizer 125. Incoming radio frequency signals are received by a receiver 126, and signal strength is measured by a signal level meter 129. The received signal strength value is sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is demodulated by an IF demodulator 128 to restore the original π/4-DQPSK—modulated digital information.

The restored information provided by the IF demodulator 128 is supplied to the equalizer 114. A symbol detector 115 converts the received two-bit symbol format of the digital data from the equalizer 114 to a single-bit data stream. The symbol detector 115 in turn produces three distinct output signals. First, control channel messages are sent to a control message detector 133 which supplies detected control channel information to the microprocessor controller 130. Second, any speech data/FACCH data is supplied to a modulo-two adder 107 and a two-burst deinterleaver 116. The speech data/FACCH data is reconstructed by assembling and rearranging information from two time slots of the received data. Third, the symbol detector 115 supplies SACCH data to a 22-burst deinterleaver 117. The 22-burst deinterleaver 117 reassembles and rearranges the SACCH data over 22 consecutive frames.

The two-burst deinterleaver 116 provides the speech data/FACCH data to two channel decoders 118. The convolutionally encoded data is decoded using the reverse of the above-mentioned coding principle. The received cyclic redundancy check (CRC) bits are checked to determine if any error has occurred. The two-burst deinterleaver 116 also detects the distinction between the speech channel and any FACCH information, and directs the decoders 118 accordingly. A speech decoder 119 processes the received speech data from the channel decoder 118 in accordance with a speech decoder algorithm (e.g. VSELP) and generates the received speech signal. The analog speech signal is enhanced using a conventional filtering technique and input to an analog/digital mode switch 92. Under the control of the microprocessor controller 130, when the system is operating in a digital mode, the mode switch 92 transmits the speech signal to a speaker 94. Messages on the fast associated control channel are detected by FACCH detector 120, and the information is transferred to the microprocessor controller 130.

The output of the 22-burst deinterleaver 117 is provided to a separate channel decoder 118. Messages on the slow associated control channel are detected by SACCH detector 121, and that information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements. The keyboard and display unit 131 enable information to be exchanged between the user and the base station.

In contrast to the multi-mode mobile station operating in a digital mode as described above, a multi-mode mobile station operating in an analog mode will now be described in relation to FIGS. 3(a) and 3(b). An analog signal generated by a human voice is detected on the microphone 100 and connected through the analog/digital mode switch 90 to a voice processing unit 10A. The voice processing unit 101A carries out a number of processing functions designed to frequency modulate the carrier signal. These processing stages include signal compression, pre-emphasis, deviation limit filtering, and post-deviation limit filtering. As these signal processing stages are well known in the cellular telephone art, no further discussion of these stages is necessary. A message generator 102A receives digital data messages from the microprocessor controller 130 in conjunction with signalling between the mobile station and the base station. These messages are transmitted both on the reverse control channel (RVCC) and the reverse voice channel (RVC) from the mobile station to the base station. A 36-bit data message generated by the message generator 102A is coded with a Bose-Chandhuri-Hocqenghem code (BCCH) to facilitate error protection and correction. This code is used to correct single-bit errors in the data stream. Only the error pattern of two or more errors will be detected. The error-correcting code adds 12 bits to the 36-bit data word, thus increasing the word length to 48 bits.

Each analog control channel message begins with a bit-sync sequence, a word-sync sequence, and a coded digital color code (CDCC). The CDCC is used to assure that the proper control channel is decoded. Similar to the control channel messages, the voice channel messages are also provided with a bit-sync sequence and a word-sync sequence.

The signalling tone (ST) generator 104A is used for signalling from the mobile station to the base station, e.g. during call set up and release. Under the control of the microprocessor controller 130, the ST is generated as a digital data message and sent as a tone on the reverse voice channel (RVC). The supervisory audio tone (SAT) generator/detector 105A, 105B is used to ensure that the correct voice channel is being detected. The SAT is transmitted continuously from the base station, detected by the SAT detector 105B in the mobile station, and looped back from the SAT generator 105A in the mobile station to the base station during voice transmission. If the expected SAT is detected in the SAT detector 105B, the transmitted voice channel carrier will be modulated with that SAT. If the SAT detected does not coincide with the SAT assigned to the appropriate voice channel, the receiver is muted.

Output signals generated by the voice processing unit 101A, the message coder 103A, the ST generator 104A, and the SAT generator 105A are received by an audio mixer 106A. The audio mixer 106A filters and combines the received signals in order to limit the carrier bandwidth and form a common signal. During speech transmission, the speech signal is modulated by the SAT. During transmission of data messages, transmission of the SAT signal is suspended. However, when the ST signal is transmitted, the SAT signal must also be transmitted. The information signal generated by the audio mixer 106A is used to frequency modulate the carrier signal in the frequency modulator 107A. The frequency modulated carrier is connected to the radio frequency modulator 122 by way of the microprocessor-controlled analog/digital mode switch 96. By mixing the modulated carrier with the output signal from the transmitting frequency synthesizer 124 in the RF modulator 122, the transmitted carrier frequency is generated in accordance with the transmitting channel selected by the microprocessor controller 130. As in the digital mode, the output signal from the RF modulator 122 is amplified in the power amplifier 123, filtered in the duplex filter 140 to prevent the transmitted radio signals from interfering with the received radio signals, and transmitted over an antenna 99.

Messages are transmitted/received over analog control or analog traffic channels using the message generator 102A and message detector 118A. Messages are transmitted over digital traffic channels via the FACCH and SACCH generators 102,103 and received via the FACCH and SACCH detectors 120, 121.

It will be appreciated that in analog cellular communications, each communications channel corresponds to a unique frequency in the cell. That several communications channels can use a single frequency in digital cellular communications is one of the reasons why digital communications capabilities are desirable.

A radio signal received from a base station over the antenna 99 is filtered in the duplex filter 140 and received in a receiver 126 for filtering and amplification. The output signal from the receiver 126 is mixed with the radio frequency carrier signal generated by the receiver frequency synthesizer 125 to generate an intermediate frequency signal. That intermediate frequency signal is connected to an intermediate frequency demodulator 115A by way of an analog/digital mode switch 98 controlled by the microprocessor controller 130. The intermediate frequency demodulator 115A demodulates the IF signal and restores the original, frequency modulated signal. The frequency demodulator 116A extracts from the frequency modulated signal messages data, the SAT, and speech. In the message decoder 117A, the received messages are decoded according to the BCH code. If the coding indicates any bit errors, the microprocessor controller 130 is informed of such errors. A decoded message is detected in the message detector 118A and transmitted to the microprocessor controller 130. The voice processing unit 119A processes the voice signals from the frequency demodulator 116A into an analog signal. The voice processing unit 119A includes conventional de-emphasis and expansion capabilities. As mentioned above, the SAT signal is detected in the SAT detector 105B and transmitted to the microprocessor controller 130.

The multi-mode mobile stations according to the present invention include dual-mode mobile stations or analog mobile stations with the added capabilities for signalling on a digital control channel. The multi-mode mobiles may be used in cellular systems together with analog only, digital only and dual-mode mobile stations by selecting the appropriate communication mode. It will be recognized by those skilled in the art that the base station and mobile station must function in at least one common mode of operation. Accordingly, the microprocessor controller 130 of the mobile station sets each an mode switch 90, 92, 96, and 98 to the appropriate mode. The microprocessor controller 130 then activates those switches electrically. When an analog or digital (voice or control) channel is active or expected to become active in the air interface, the switches 90, 92, 96 and 98 are all connected either to the analog or to the digital subsystem respectively. Therefore, these switches may be thought of as four sets of "contacts" on the same "relay" even though the switches are semiconductor switches in a preferred embodiment.

The above description relates to the hardware that can be used in conjunction with the methods according to the present invention. It is understood that this hardware is for purposes of example only and other suitable systems may be employed without departing from the scope of the invention.

According to the present invention, the disturbance problems within a cellular network may be reduced by assigning preferably analog traffic channels to mobile stations using analog or analog and digital traffic channels based on a predetermined criteria based on power. One criteria is satisfied when the sending power required is above a threshold L1. A second criteria is satisfied when the mobile stations is accessing a base station due to a directed retry order. When a directed retry order is sent, the mobile necessarily must transmit at a higher power level in order to successfully transmit to the new base station.

According to the present invention, when the traffic level of a cell approaches an unacceptably high level of congestion, the managing of traffic channels in the land system may be designed to reserve a number of analog traffic channels in neighbor cells for the described purposes of accepting handoff requests and directed retry requests. According to the present invention, the above described disturbance problems may also be reduced by preferably handing off analog or dual mode mobile stations from cells approaching congestion to less congested neighboring cells and assigning analog traffic channels in the target cells.

According to the present invention, the above described disturbance problems may also be reduced by preferably allowing analog traffic channels to be used at the periphery of a cell. This may be achieved, for example, by making an intra-cell handoff to an analog channel when the power level required for sending from a dual mode mobile station passes above a threshold L1, i.e., the mobile has moved closer to the periphery of the cell. Conversely, dual mode mobile stations using analog traffic channels may be handed off to a digital traffic channel when the power level required for sending in the mobile station passes under another lower threshold L2, i.e., the mobile has moved closer to the base station. These thresholds L1 and L2 are individually set for each cell.

Figure 5:
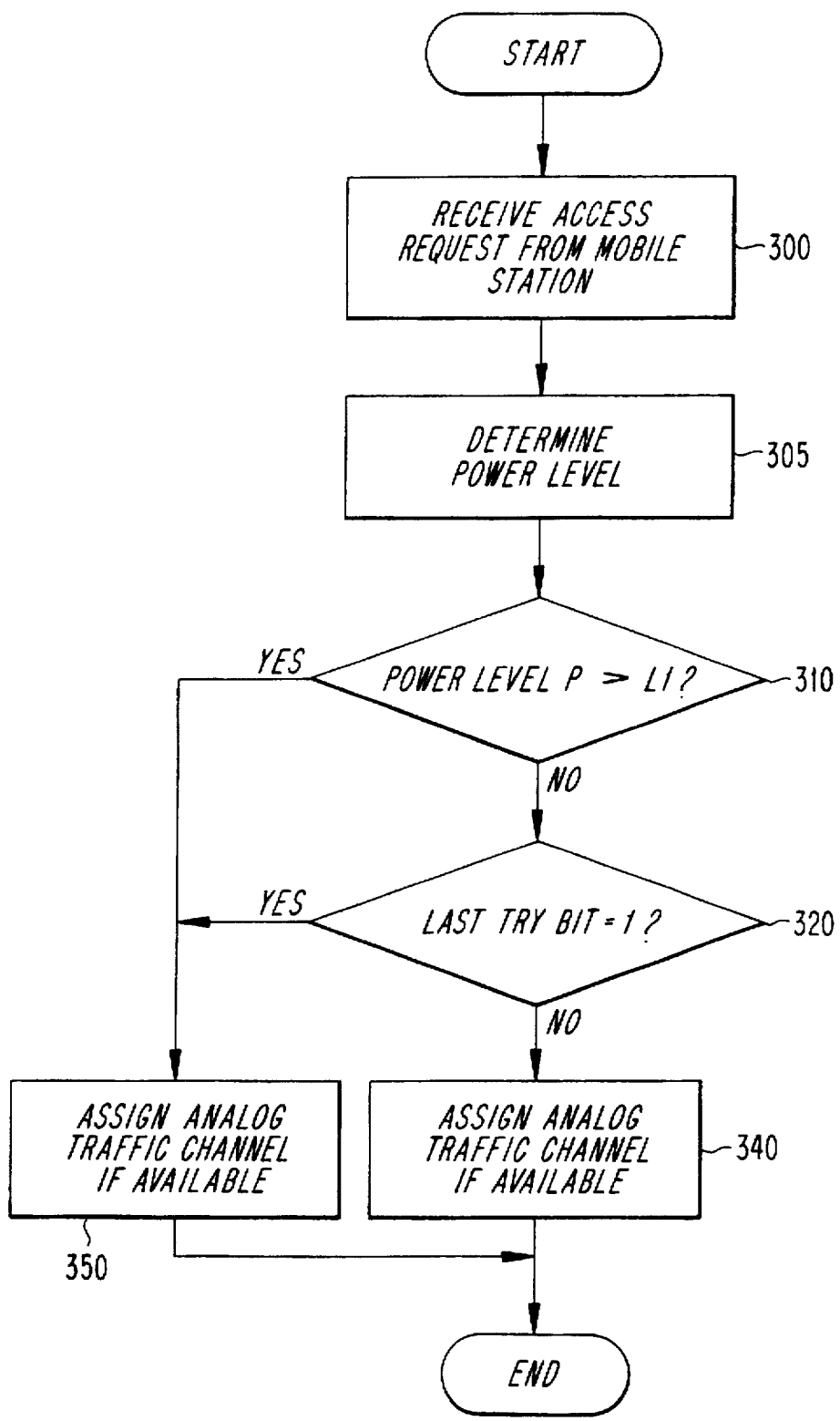
FIG. 5 is a flow chart of a method carried out in a target cell according to an embodiment of the present invention.

The routines shown in FIGS. 4-6 illustrate routines carried out in the land system and/or each cell in the network on a continuous basis according to preferred embodiments of the present invention. The routines may be implemented in any computer software using known techniques of computer programming within the skill of an ordinary artisan in the technology.

FIG. 4 is a flow chart of a routine carried out in the land system for implementing the method according to one embodiment of the present invention. At step 200, it is determined whether any of the cells are overly congested. The level of congestion can be determined in any manner, including the number of unassigned channels, the ratio between the number of unassigned channels and the total number of channels, etc. The level of congestion at which a cell is determined to be congested may vary from cell to cell, depending on such factors as anticipated traffic level for that cell, the number of subscribers, etc.

If a cell is overly congested, the land system can instruct neighboring cells to reserve a number of analog traffic channels for purposes of receiving handoffs or accesses pursuant to directed retry orders (step 210). Additionally, the land system can send handoff orders and directed retry orders to mobile stations having established calls or new calls (step 220) for some of the traffic within the congested cells to redistribute the traffic level, making use of analog rather than digital traffic channels and thus reducing C/I disturbance. Such handoff or directed retry orders are sent to mobile stations capable of at least communicating on analog traffic channels. These orders identify neighboring cells which have available reserved analog traffic channels for assignment.

FIG. 5 illustrates a routine that is carried out in each cell within a network. When an access request is received from a mobile station (step 300), the power level required for the mobile to send its transmission to the base station is determined (step 305). If a predetermined criteria based on power is met, an analog traffic channel is assigned, if one is available, to reduce the adjacent channel disturbance within the network. In particular, if the required power level P is above the threshold L1 (step 310), or if it is determined that the access request is due to a directed retry order (step 320), the cell preferably assigns an analog traffic channel (step 350) if one is available. In particular, in step 310, as the power level P is above the threshold, the criteria is satisfied.

In U.S. cellular systems, the accessed cell recognizes access due to a directed retry order by the value of the "Last Try Bit" (LT bit) in the reverse analog control channel message as called for in the U.S. standards, EIA/TIA IS-54-A, p. 119-121. When the LT bit is equal to 1, the access is according to a directed retry order. When a directed retry order is sent, the mobile station must transmit at a greater power level than it would otherwise, since the base stations named in the directed retry order are further away from the mobile station.

If neither of the criterion is met, a digital channel is assigned, if one is available (step 340). In this manner, adjacent channel disturbance problems can be reduced.

Another routine that is running within a cell in the land system is shown in FIG. 6. According to this routine, the land system determines when a change is required in the power level required for the mobile station to transmit communications to the base station (step 400). The power level to be ordered is then compared to a first threshold L1 assigned to that base station for determining whether an intra-cell handoff to an analog traffic channel is desirable (step 410). In particular, the first threshold L1 could be set to define a periphery area of a cell and depends on a variety of factors such as the size of the cell, the anticipated traffic, etc. Any power level above the threshold L1 means that the mobile station is now located near the periphery of the cell. Thus, the test at step 410 determines when the power level P to be ordered passes above the threshold L1 and the present traffic channel is digital. In such a case, an intra-cell handoff order is sent to the mobile station to cause it to switch its call from a digital traffic channel to an analog traffic channel (step 420).

When a mobile station moves back to the inner circle, away from the periphery, that is, when the required power level passes below a second threshold L2 and the present traffic channel is analog (step 430), an intra-cell handoff order may be sent to cause the mobile station switch and transmit on a digital traffic channel (step 440). The second threshold is also set for each cell, depending on such things as size, traffic, etc. Hysteresis between the two thresholds avoids oscillating handoff problems.

According to another embodiment of the present invention, the digital traffic channels could be of the CDMA type rather than the TDMA type described above. In the CDMA case, the co-channel disturbance is decreased rather than the adjacent channel disturbance. Additionally, intra-cell handoff, not directed retry or handoff to neighbor cells, is of interest. This is because analog channels would be used by mobile stations in the periphery of the cells, thereby protecting uplink (mobile to base) CDMA transmission in a cell from disturbance caused by uplink CDMA transmissions from mobile stations in neighbor cells.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. In a cellular mobile system having both analog and digital traffic channels and including a land system serving a plurality of cells, a plurality of mobile stations of a first kind using said analog channels only and a plurality of mobile stations of a second kind using both said analog and digital traffic channels, a method of reducing disturbance of communications within the system when a mobile station of said second kind leaves a first cell for a second cell, said second cell having a heavy traffic load, comprising the steps:

in the land system:

sending a directed retry order to a mobile station of said second kind identifying at least one target cell adjacent to said second cell and having at least one analog traffic channel available;

in the mobile station:

accessing said target cell identified in the received directed retry order; and in the accessed target cell:

assigning to the accessing mobile station of said second kind an analog traffic channel in preference over a digital traffic channel based on said directed retry order.

2. In a cellular mobile system having analog and digital traffic channels and including a plurality of base stations, a plurality of mobile stations of a first kind using said analog channels only, and a plurality of mobile stations of a second kind using both said analog traffic channels and digital traffic channels, an apparatus for reducing disturbance in the system when a mobile stations of said second kind leaves a first cell for a second cell, said second cell having a heavy traffic load, comprising:

means for sending a directed retry order to a mobile station of said second kind, the directed retry order naming at least one of the base stations in the system adjacent to said second cell and having at least one analog traffic channel available;

means for controlling said mobile station of said second kind to access said one of the base stations named in the directed retry order; and means for controlling the accessed base station to assign an analog traffic channel in preference over a digital traffic channel based on said directed retry order.

3. In a cellular mobile system having analog and digital traffic channels and including a plurality of base stations, a plurality of mobile stations of a first kind using said analog channels only and a plurality of mobile stations of a second kind using both said analog traffic channels and digital traffic channels, an apparatus for reducing disturbance in the system when a mobile station of said second kind is leaving a first cell for a second cell, said second cell having a heavy traffic load, comprising:

means for sending a directed retry order to a mobile station of said second kind identifying a target base station; and means for controlling the target base station to assign an analog traffic channel in preference over a digital traffic channel based on said directed retry order.

* * * * *